UNITED STATES PATENT OFFICE.

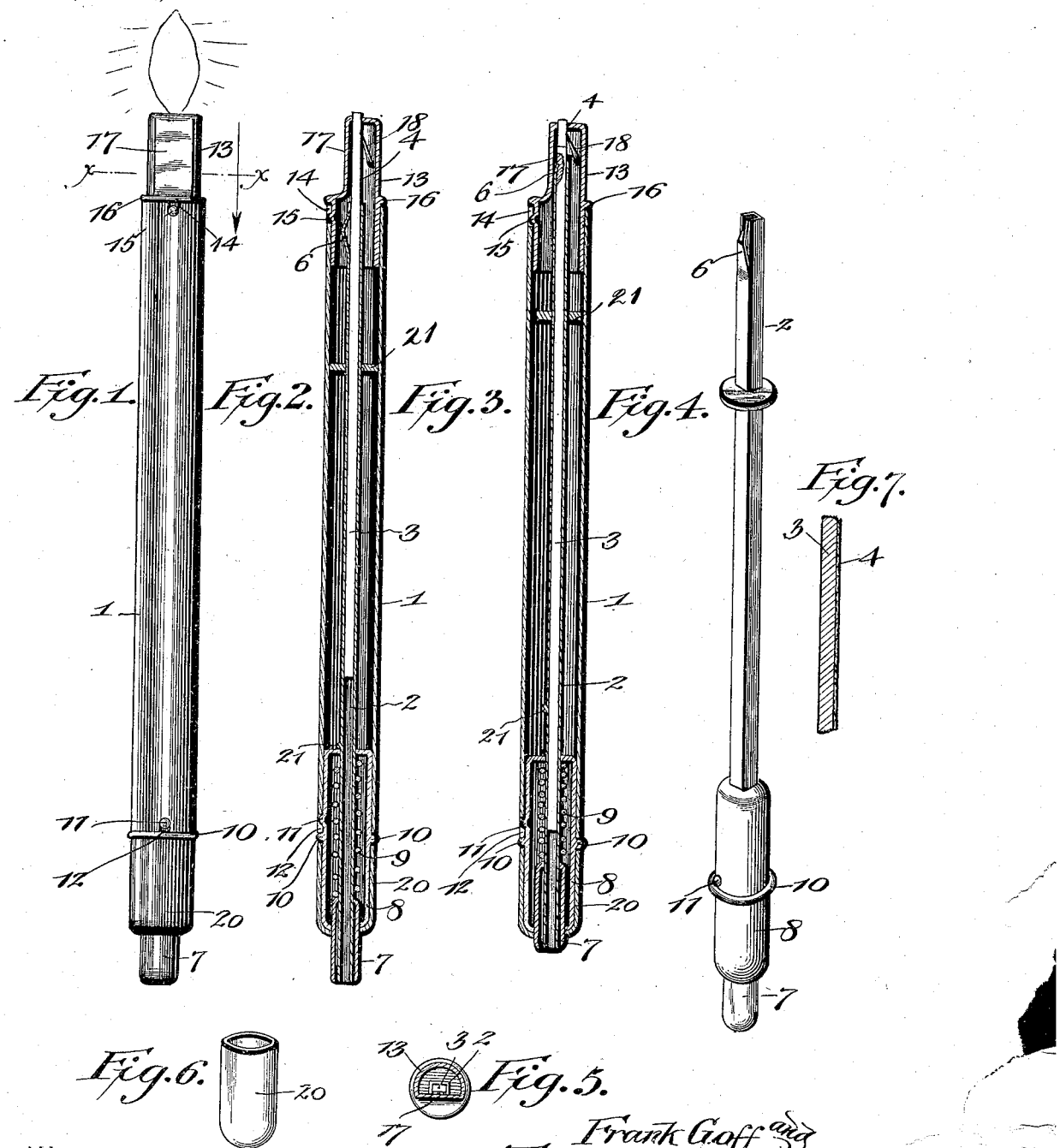

FRANK GOFF AND THOMAS HENRY JOINER, OF CAMDEN, NEW JERSEY, ASSIGNORS TO THE INSTANT LIGHTER AND NOVELTY MANUFACTURING COMPANY, OF NEW JERSEY.

MAGAZINE-LIGHTER.

SPECIFICATION forming part of Letters Patent No. 639,169, dated December 12, 1899.

Application filed September 28, 1898. Serial No. 692,101. (No model.)

*To all whom it may concern:*

Be it known that we, FRANK GOFF and THOMAS HENRY JOINER, citizens of the United States, residing at Camden, in the county of Camden and State of New Jersey, have invented a new and useful Magazine-Lighter, of which the following is a specification.

Our invention relates to pocket magazine-lighting instruments; and the object thereof is to provide such a device which will positively feed the taper to its last portion and hold the same for ignition, and is further an improvement upon our former patent, No. 521,466, granted June 19, 1894.

To this end the invention consists in certain combinations and construction of parts, as will be hereinafter more fully described, shown in the drawings, and particularly pointed out in the appended claims.

In the drawings, Figure 1 is a side elevation of the device. Fig. 2 is a longitudinal sectional view thereof. Fig. 3 is a similar view showing the taper container and feeder forcing a new taper against the lower end of the old partly-consumed taper. Fig. 4 is a detail perspective view of the taper container and feeder. Fig. 5 is a transverse sectional view taken on the line $x\,x$, Fig. 1. Fig. 6 is a detail view of the removable cap. Fig. 7 is a detail view of a portion of a taper.

Like numerals of reference indicate corresponding parts in all the figures of the drawings.

Referring to the accompanying drawings, 1 designates a tubular casing open at each end and adapted to contain and conceal the taper and the operating parts of the device. Arranged centrally within the casing is a movable taper container and feeder in the form of a tube 2, which contains the taper 3. The taper is preferably flat or rectangular in cross-section, having an igniting-surface 4 upon one side which extends the entire length of the taper. The taper may be provided with an igniting-surface upon all of its sides, but preferably having but one such surface. The feeding-tube is of a similar cross-sectional shape and incloses the taper loosely to permit of a longitudinal movement therein. At the upper end of the feed-tube one of its sides is formed into a spring-finger 6, having its pointed end extending within the tube and below the upper edge thereof. The taper is placed in the tube with its igniting-surface opposite the finger 6, so that said finger may engage the taper without igniting the same. The lower end of the feed-tube 2 is provided with an enlarged tubular thumb-piece 7, and a short tubular sleeve 8 incloses the upper end of the thumb-piece and the feed-tube for a suitable distance. A coiled spring 9 encircles the feed-tube within the sleeve 8 and bears against the upper inner end thereof and against the upper end of the thumb-piece. The feed-tube thus formed is placed in the casing 1 through one of its open ends. The sleeve 8 also enters within the end of the casing 1 until stopped by means of an annular raised ring 10, which engages with the end of the casing 1. A lug 11 is formed upon the sleeve 8 just above the ring 10, which is adapted to engage a longitudinal slot 12, formed in the end of the casing 1, whereby the feed-tube is always placed in its proper relative position. To limit the return movement of the feed-tube, a stop 21 is formed upon one side thereof, which engages with the end of the stationary sleeve 8. The other end of the casing 1 is provided with a removable head 13. This head is fitted within the end of the casing, which has a longitudinal slot 14 to receive a lug 15, formed upon the head, which latter is also provided with an annular raised ring 16, whereby the head may always be fitted in its proper relative position. The protruding portion of the head 13 is flattened for its entire length upon one side, as shown at 17, and this flattened portion is adapted to be arranged in the same longitudinal plane as the finger side of the feed-tube. The purpose of this arrangement is to provide a lateral support for the terminals of a partly-consumed taper and permit of the same resting firmly against the side of the head after it leaves the feed-tube, so that the new taper may be fed directly against the end of the old taper, whereby the latter is prevented from becoming broken by the feeding action.

To hold the taper after being fed outward, a suitable spring-finger 18 is provided upon the inside of the head and above the spring-finger of the feed-tube. The pointed end of this finger reaches nearly to the top of the head, which is provided with an opening similar in shape to the taper.

It will be noted that the flattened portion 17 of the head, the slots 12 and 14 of the casing 1, and the lugs 11 and 15 of the head and sleeve 8, respectively, are all alined upon the same side of the device, so that when assembled as heretofore described the taper, feeding-tube, and head are always in their proper relative positions, and the feed-tube is guided within the casing by means of an annular collar or flange 21.

In the operation of the device the thumb-piece 7 is pressed inward, which forces the other end of the feeding-tube 2 beyond the end of the casing, carrying the taper 3 into the head 13, where the igniting-surface of the taper engages the pointed end of the stationary finger 18 and is ignited. When the thumb-piece is released, the coiled spring 9 causes the feeding-tube to resume its normal position, but the stationary igniting-finger 18 holds the taper in its fed position.

As illustrated in Fig. 3, when a taper has been nearly consumed and a new one inserted into the feeding-tube from the lower end thereof the upper end of the new taper will bear evenly against the lower end of the old taper by reason of the arrangement of the flattened portion of the head until said old taper has been entirely consumed. Also by reason of the spring-finger 6 terminating short of the end of the feed-tube 2 the very last portion of the taper will be held tightly within the end and against the opposite side of the feed-tube as it is fed to the stationary finger 18. By this relative construction and arrangement all of the taper will be fed and consumed and no portion will be broken off and deposited about the feed-tube within the casing 1 and interfere with the proper operation of the device.

A removable cap 20 may be carried by the lower end of the sleeve 8, being open at both ends and adapted to be removed and placed over the head 13 to present a clean surface when placed in a pocket of the operator, as the burning of the taper will deposit a dirty substance upon the end of the head.

The spring-finger 6 of the feed-tube is shown opposite the igniter 18; but it may be arranged upon the same side as the igniter without affecting the operation of the device.

It will thus be noted that the present improved construction and arrangement of parts produce an exceedingly simple and useful device in which changes in the form, proportion, and minor details may be made without departing from the spirit and scope or sacrificing any of the advantages of our invention, and therefore we do not wish to be understood as limiting ourselves to the precise construction and arrangement as herein set forth.

Having thus described our invention, we claim—

1. In a lighting implement, the combination of a casing, a movable taper container and feeder arranged within the casing, and a head for the casing having an igniter and a lateral support for the terminal of the partly-consumed taper when the latter has been forced out of the container and feeder, whereby the entire taper may be fed and consumed and is prevented from becoming broken, substantially in the manner shown and described.

2. In a lighting implement, the combination with a casing, a movable taper container and feeder, and means for igniting the taper, of a head for the lighting end of the casing, said head being formed with one side in the same longitudinal plane as the corresponding side of the feeder, whereby a lateral support is provided for the terminal of a partly-consumed taper, and a new taper is fed directly against the end of the old taper and the latter is prevented from becoming broken by the feeding action, substantially as and for the purpose set forth.

3. In a lighting implement, the combination with a casing, a movable taper container and feeder, and means for igniting the taper, of a removable head for the lighting end of the casing, said head having one side flattened in the plane of the corresponding side of the feeder and forming a lateral support for the terminal of a partly-consumed taper, whereby a new taper is fed directly against the end of the old taper and the latter is prevented from becoming broken by the feeding action, substantially as shown and described.

4. In a lighting implement, the combination of a casing carrying a fixed igniter, and a taper container and feeder arranged within the casing, and having an annular spacing collar or flange slidably engaging the interior walls of the casing, and forming a guide for the taper container and feeder, substantially as and for the purpose set forth.

5. A lighting implement, comprising a casing, and a movable taper container and feeder in the form of a tube, and arranged within the casing, said tube being rectangular in cross-section and provided near its upper end with a spring-finger arranged to engage the taper below the top and hold the same against the opposite side of the tube, whereby the very last portion of the taper will be fed, substantially as shown and described.

6. In a lighting implement, the combination of a casing provided with alined slots at its opposite ends, a removable taper container and feeder, and a removable head for the lighting end of the casing, the taper container and feeder and head being each provided with a lug adapted to engage the respective slots of the casing, whereby the taper container and feeder and the head may be arranged in a predetermined relative position, substantially as shown and described.

7. A lighting implement, comprising a casing, a taper container and feeder, and means for igniting the taper, the container and feeder being provided with an enlarged thumb-piece at one end, a sleeve inclosing a portion of the thumb-piece and the container and feeder, a coiled spring arranged within the sleeve and connected thereto and to the container and feeder, and a stop formed upon the latter and adapted to engage the sleeve, the latter being removably secured to the casing, substantially as shown and described.

8. In a lighting implement, the combination of a casing, a movable taper container and feeder located within the casing, and a fixed igniter carried by the casing beyond the end of the container and feeder and in the path thereof, and adapted to both ignite and hold the taper in its fed position after being ignited, and a lateral support for the projecting end of the taper, said support being located opposite the igniter and adapted to hold the taper against the pressure of the igniter, substantially as shown and described.

In testimony that we claim the foregoing as our own we have hereto affixed our signatures in the presence of two witnesses.

FRANK GOFF.
THOMAS HENRY JOINER.

Witnesses:
ERNEST ARMSTRONG,
JOHN MAYHEW.